Patented Aug. 1, 1933

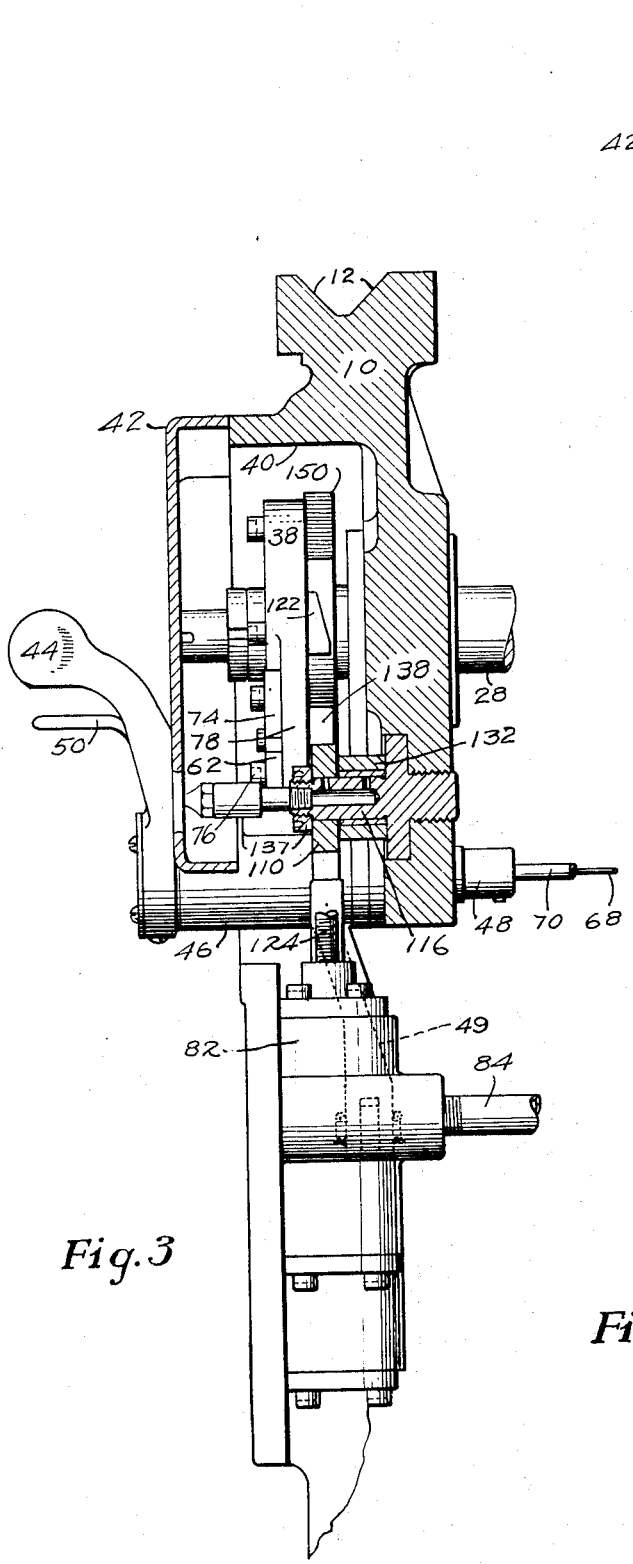
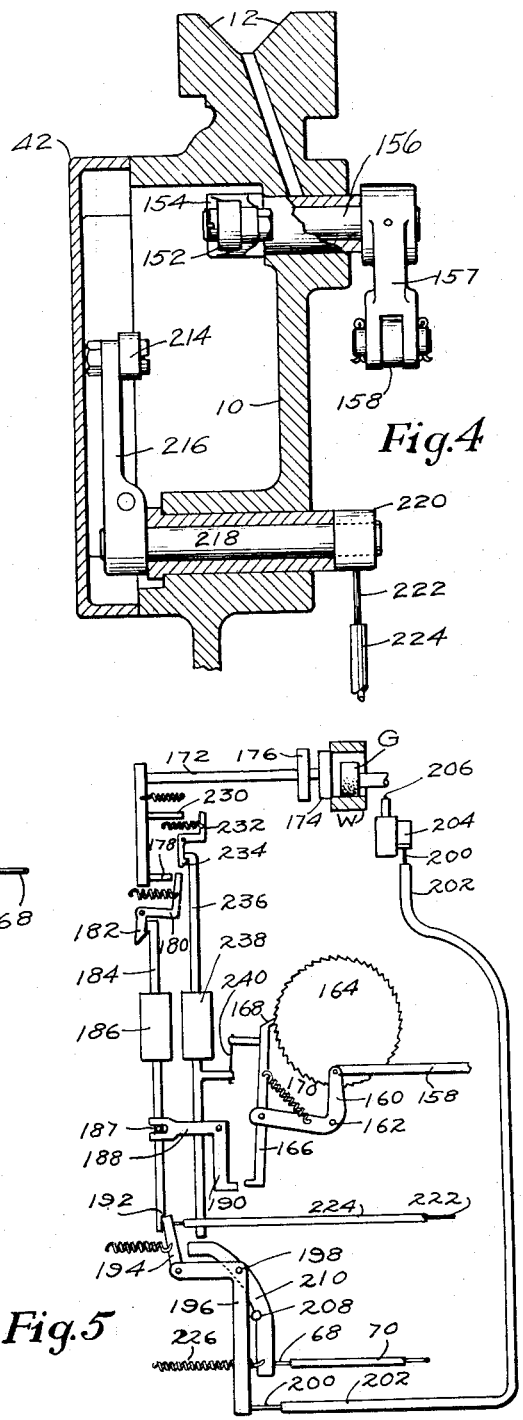

1,920,532

UNITED STATES PATENT OFFICE 1,920,532

MACHINE TOOL CARRIAGE CONTROL

Clarence C. Stevens, Forestville, Conn., assignor to The New Departure Manufacturing Company, Bristol, Conn., a Corporation of Connecticut Application May 29, 1930. Serial No. 457,336

21 Claims. (Cl. 51—50)

This invention relates to machine tool carriage controls and comprises all the features of novelty herein disclosed. An object of the invention is to provide a step-up-motion mechanism to control the various strokes of a reciprocating carriage such as that carrying a grinding wheel or a work holder. Another object is to provide a centralized control mechanism for carriage movements such that projecting reversing dogs and the like can be removed from the carriage itself and placed in a compact and out of the way position. Another object is to provide improved actuating devices for control valves and feed mechanisms such that magnets and other electrical devices can be eliminated from automatic machine tools.

To these ends and to improve generally and in detail upon devices of this character, the invention also consists in the various matters hereinafter described and claimed. In its broader aspects, the invention is not necessarily limited to the specific construction selected for illustrative purposes in the accompanying drawings in which Fig. 1 is a sectional view of a portion of the improved mechanism with some parts in front elevation.

Fig. 3 is a cross sectional view on line 3—3 of Fig. 1.

Fig. 4 is a cross sectional view on line 4—4 of Fig. 1, and

Fig. 5 is a diagrammatic view.

Figure 1:
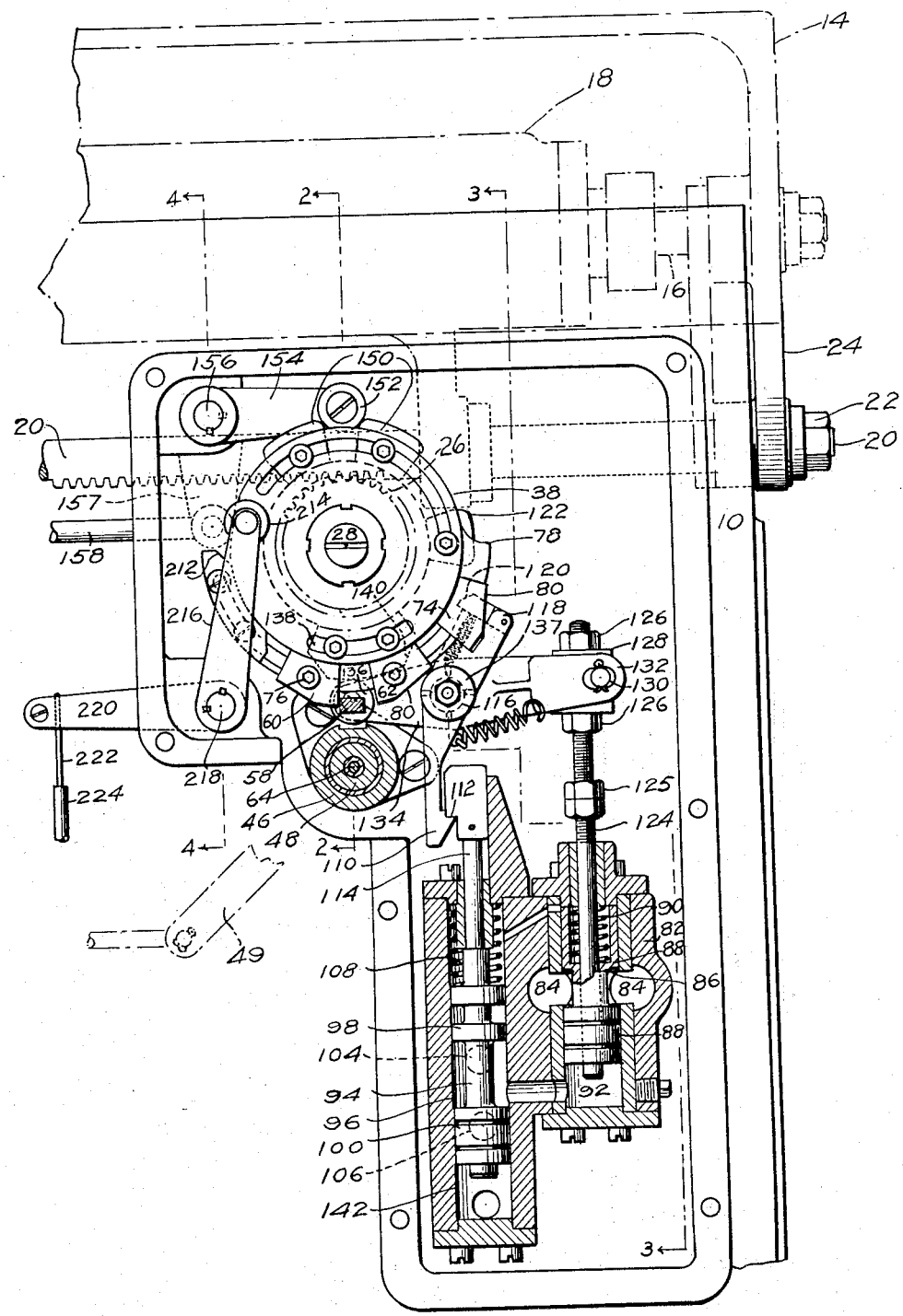
Figure 2:
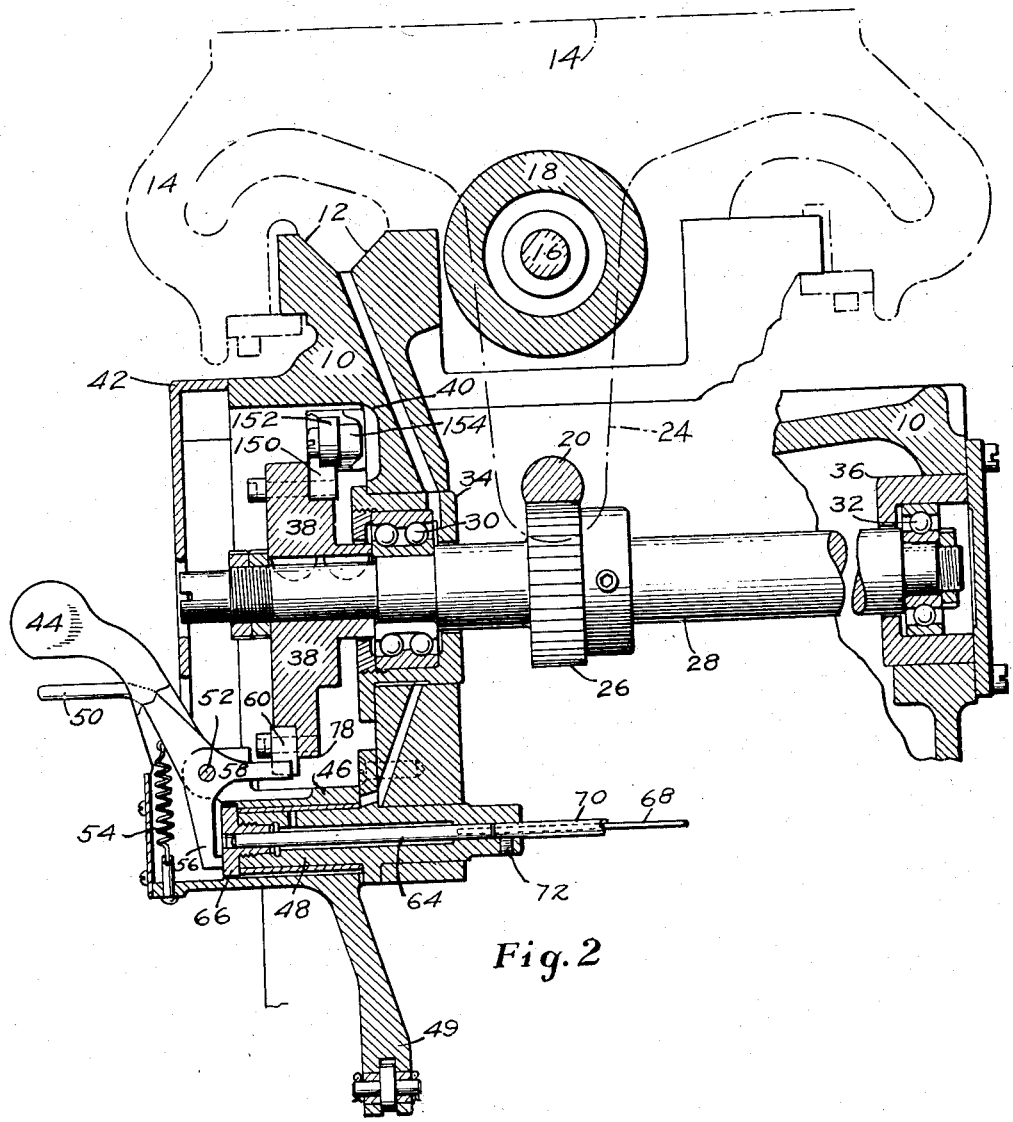
Fig. 2 is a cross sectional view on line 2—2 of Fig. 1.

In a common type of internal grinding machine, a carriage supporting a grinding wheel is reciprocated under control of a reversing lever which is alternately actuated by dogs adjustably secured to the carriage. When the carriage stroke is short, as for grinding short work-pieces, it is difficult to cause the dogs and reverse lever to disengage quickly enough to allow an amplification of the carriage stroke as for wheel dressing or for backing the carriage away to a reloading position. This attempted disengagement is usually controlled by magnets from a gauge and leads to complicated and hence unreliable and expensive mechanisms. The dogs also project from and travel with the carriage and are in the way. The present invention avoids these disadvantages and provides reliable and simple control mechanism.

The numeral 10 indicates a portion of the frame of a machine tool having ways 12 for a sliding carriage 14. A piston rod 16 is fastened to the carriage and reciprocated by the usual double acting cylinder 18 on the frame. A short rack bar 20 is clamped by a nut 22 to a depending projection 24 at one end of the carriage and meshes with a pinion 26 which is keyed to a cross shaft 28. The shaft is journalled on ball bearings 30 and 32 supported in cupped housings 34 and 36 clamped in aligned bores of the frame. A disc 38 is keyed to the shaft in a recess 40 of the frame, the recess being closed by a removable cover plate 42. The disc is located directly above the usual reversing lever 44 whose hub 46 is rockably journalled on a hollow stud 48 secured to the frame. The reversing lever has a depending arm 49 connected to the usual reversing valve (not shown) which controls the pressure fluid in the actuating cylinder. The reversing lever is slotted axially to receive a three-armed lever 50 which is pivoted in the slot on a cross pin 52 and pressed to operative position by a coil spring 54. An arm 56 of the lever 50 projects downwardly across the center of the hollow stud and another arm 58 projects rearwardly towards the periphery of the disc 38 for actuation by a series of dogs thereon.

The disc oscillates in an arc when the carriage reciprocates but the disc is larger than the pinion 26 so that its periphery has a magnified or step-up motion with respect to the carriage. Hence reversing dogs 60 and 62 which alternately actuate the reverse lever by engaging the arm 58 can be placed further apart on the disc than they could be on the carriage and, in spite of a short carriage stroke, the arm 58 can be sufficiently strong and thick and have sufficient clearance with the dogs to enable it to be snapped out between them freely when it is desired to amplify the stroke of the carriage. This snapping out or tripping is accomplished by plunger 64 guided in the bore of the hollow stud 48 and in the bore of a flanged nut 66 which retains the reversing lever hub 46 on its bearing. The plunger 64 is rounded at the front end and is shoved forwardly through the axis of the hub 46 by a Bowden wire 68 having its casing 70 clamped to the hollow stud by a set screw 72. As will appear, the Bowden wire is pushed endwise through its non-extensible casing under control of a gauge plug without the use of a magnet. This tripping of the arm 58 usually occurs just previous to a finish grinding operation to effect a short increase in the stroke of the carriage to bring the grinding wheel out of the work for dressing. The carriage returns under control of a third dog 74 which effects the delayed reversal when it travels around to meet the arm 58. All the dogs 60, 62 and 74 are adjustably secured by clamp screws 76 to a flange 78 on the disc and all have inclined cam faces 80 on one side so that, whenever these faces approach the arm 58, they will cam the arm downwardly to let it snap back to the other side under control of the coil spring 54. It should be noted that the disc does not have a complete revolution because the rack bar is short and need only engage its pinion when the carriage is well advanced. When the carriage retreats, the rack bar leaves the pinion and the disc then stops turning until it is reversed by the returning carriage.

The amplified dressing stroke of the carriage is desirably much slower than the rough grinding strokes and the finish grinding strokes are desirably somewhat slower than the rough grinding strokes but faster than the dressing stroke. Throttling actions on the carriage actuating cylinder are accordingly produced and are controlled by cams or dogs on the disc. A throttle valve casing 82 has passages 84 piped to the main actuating cylinder 18 and a throttle valve 86 having separated pistons 88 is slidable in the casing. The valve is urged down towards throttling position by a coil spring 90 whenever fluid in the chamber 92 below the piston is exhausted under control of a piston valve 94 in a chamber 96. The piston valve 94 comprises spaced pistons 98 and 100 connected by a valve stem. When the valves are in the position shown in Fig. 1, pressure fluid enters the chambers 96 and 92 through a pipe 104 so that the throttle valve 86 is held in raised position. A pipe 106 exhausts the fluid from the chambers when the piston valve is lowered by a coil spring 108. Piston valve 94 is held in raised position by a spring pressed latch 110 engaging a projection 112 on the valve stem 114. The latch is pivoted on a stud 116 and has an arm 118 carrying a spring-pressed, pivoted cam plate 120 arranged in the path of a cam or dog 122 adjustably secured to the rear side of the disc 38. The cams come into engagement to trip the latch 110 on the amplified wheel dressing stroke of the carriage and before the dog 74 engages the arm 58. Maximum throttling action thus occurs during the wheel dressing strokes when the throttle valve 86 is in lowermost position.

The throttling action is thereafter reduced to get a faster grinding stroke by the following mechanism which wholly or partly raises the throttle valve. The stem 124 of the throttle valve 86 is threaded to receive stop nuts 125. The upper end of the valve stem has clamping nuts 126 adjustably holding a block 128 having a pivot pin 130 engaging slots on the bifurcated arm of a lever 132 pivoted on the stud 116 and having an arm 134 carrying a cam roll 136. The stud 116 has a portion threaded into the frame 10 and is shouldered to receive a nut 137 which holds the hub of the lever 132 and the hub of the latch 110. The roll lies just below the disc in a position to engage a cam plate 138 adjustably fastened to the rear side of the disc. While the carriage and the disc make their above mentioned amplified stroke, an inclined cam face 140 releases the cam roll to allow the throttle valve 86 to slide down and throttle the fluid but, on the return stroke, the cam face again engages the roll and raises the throttle valve, against the tension of its spring, to a degree determined by the height of the cam plate and by the adjustment of the block 128. Hence, during continued oscillation of the carriage, with the reversing dogs straddling the trip arm 58, the cam plate 138 maintains the intermediate position of the throttle valve, as determined by the initial setting of the block 128 by the nuts 126, and finish grinding strokes occur at a speed greater than dressing but less than during rough grinding. When the work-piece is reduced to size, the arm 58 is again tripped for an interval, as will appear, to clear both dogs 62 and 74 and the carriage retreats to loading position. As the carriage retreats, the piston valve 94 is raised to latched position by a controlled pressure line communicating with a chamber 142 below the piston 100 and pressure fluid again has access to the chambers 96 and 92 to raise or open wide the throttle valve for full speed retreat of the carriage.

In the position indicated in Fig. 1, the mechanism is set to cause reciprocation of the carriage at high speed, next to throttle the speed during dressing, and finally to speed up again to the original speed but it will be understood that the block 128 can be adjusted so that the cam roll 136 will be initially spaced below the cam plate 138, the throttle valve 86 being held in fully raised position by the fluid pressure in the chamber 92. Hence, upon release of fluid pressure during the amplified stroke of the carriage, the throttle valve is lowered by its spring 90 as far as the cam 140 permits and is raised again to the intermediate position with the cam roll 136 held against the cam plate 138 by the coil spring 90 which latter can only become effective when the pressure fluid in the chamber 92 is released.

The oscillating disc 38 also actuates the cross feed of the usual slide supporting the work head or the grinding wheel. One or two cams 150 (depending upon whether a feed stroke is desired at one or both strokes of the carriage) are adjustably fastened to the rear of the disc in a position to engage a cam roll 152 on an arm 154 carried by a shaft 156. Another arm 157 keyed on the shaft is pivotally connected to a link 158 which is also pivoted to an arm of a bell crank lever 160 (Fig. 5) rocking on a pivot pin 162 near a feed ratchet wheel 164. The bell crank lever 160 has an arm pivotally supporting a lever 166 having a pawl 168 pressed against the ratchet wheel by a coil spring 170. As will appear, the feed pawl can be partially withdrawn to reduce the feed or entirely retracted to stop the feed under control of a gauge.

In the diagram, G represents a grinding wheel operating in the bore of a work-piece W. In alignment with the work-piece is a gauge rod 172 having two gauge plugs 174 and 176 the more advanced being the smaller. The gauge rod is spring pressed towards the work and, when the first gauge plug enters the work at the conclusion of rough grinding, a pin 178 is carried into engagement with a spring pressed latch lever 180 having a latch hook 182 engaging a shoulder on a piston rod 184 traversing a cylinder 186. Tripping of the latch results in a lowering of the piston rod which carries a cross pin 187 engaging a slot in an arm of a bell crank lever 188. The lever is swung to carry its depending arm 190 into contact with the lever 166 to reduce the effective stroke of the feed pawl. The rod also has a shoulder 192 engaging the end of a spring pressed latch arm 194 pivoted on a bell crank lever 196 secured to a rock shaft 198. The lever 196 is actuated counterclockwise by the descending piston rod to push a Bowden wire 200 through its fixed casing 202 to actuate a valve 204 controlling the advance of a wheel dressing diamond 206 to operative position. The bell crank lever 196 also engages a pin 208 on a bent lever 210 which is loosely journalled on the rock shaft 198. Bent lever 210 pushes the above mentioned Bowden wire 68 through its fixed casing 70 to advance the plunger 64 and trip the arm 58 on the reverse lever temporarily, thereby initiating the amplified stroke of the carriage for wheel dressing. The oscillating disc effects return of the Bowden wires. A cam 212 is adjustably secured to the flange 78 of the disc in a position to engage a roll 214 on an arm 216 of a rock shaft 218 when the disc makes its first amplified stroke clockwise corresponding to the outward amplified stroke of the carriage. The cam rocks the shaft 218 clockwise together with a second arm 220 which pulls on a Bowden wire 222 extending through its fixed casing 224 to the latch arm 194 thereby releasing the arm from the shoulder 192 and allowing the coil spring 226 to pull or retract the Bowden wires 200 and 68 and the plunger 64. Hence the trip arm 58 on the reverse lever is released after a short interval to snap between the dogs 60 and 62 when the disc makes its return swing, and the short reciprocation of the carriage continues for finish grinding. The cross feed is slow at such time and reciprocation of the carriage is at a slow speed.

When the work-piece reaches finished size, the second gauge plug 176 enters and carries a pin 230 into engagement with a spring pressed latch lever 232 having a latch hook 234 engaging a shoulder on a piston rod 236 traversing a cylinder 238. Tripping of the latch results in a lowering of the piston rod which engages the bent lever 210 and rocks it counterclockwise to once more trip the arm 58 on the reverse lever. The arm is kept in tripped position so that it clears the dog 74 and the carriage retreats to loading position. The lowering of the rod 236 also pulls on a Bowden wire 240 to swing the lever 166 and lift the feed pawl 168 entirely from the ratchet wheel. Raising of the piston rods 184 and 236 to latched position restores the controls to initial position and when the carriage advances for another operation, the rack bar 20 turns the disc 38 counterclockwise and the inclined faces 80 on the dogs 74 and 62 press down the trip arm 58 to allow the arm to reach the operative position between the reversing dogs 60 and 62. The spring pressed cam plate 120 swings on its pivot to let the cams or dogs 122 and 150 pass by it.

I claim:

1. In mechanism of the character described, a frame, a carriage, means for reciprocating the carriage through a short stroke, an oscillated member, means for gearing said member to the carriage for operation thereby and constructed and arranged to give the member a greater amplitude of oscillation than the carriage, and means on said oscillated member for controlling carriage movements; substantially as described.

2. In mechanism of the character described, a frame, a carriage, means for reciprocating the carriage through a short stroke, a reversing member controlling reversal of the carriage, a member geared to the carriage and having a greater amplitude of oscillation than the carriage, and means on said oscillated member for actuating the reversing member; substantially as described.

3. In mechanism of the character described, a frame, a carriage, means for reciprocating the carriage, a reversing member controlling reversal of the carriage, a member rockably mounted on the frame, a rack and a pinion gearing said member to the carriage for rocking action thereby, and dogs carried by the rockable member for actuating the reversing member; substantially as described.

4. In mechanism of the character described, a frame, a carriage, means for reciprocating the carriage, a reversing member controlling reversal of the carriage, a member mounted in the frame and oscillated by the carriage, dogs carried by the oscillated member for actuating the reversing member, and means for temporarily placing the reversing member and one of the dogs out of reversing relation to amplify the stroke of the carriage; substantially as described.

5. In mechanism of the character described, a frame, a carriage, means for reciprocating the carriage, a reversing member controlling reversal of the carriage, a member oscillated by the carriage, dogs carried by the oscillated member to actuate the reversing member, a work gauging member, and means controlled by the work gauging member for temporarily placing the reversing member and one of the dogs out of reversing relation to amplify the stroke of the carriage; substantially as described.

6. In a device of the character described, a frame, a carriage, means for reciprocating the carriage, a reversing member controlling reversal of the carriage, a member oscillated by the carriage, dogs carried by the oscillated member to actuate the reversing member, means for temporarily placing the reversing member and one of the dogs out of reversing relation to amplify the stroke of the carriage, and means actuated by the oscillated member for controlling the restoration of the reversing member and dog to reversing relation; substantially as described.

7. In a device of the character described, a frame, a carriage, means for reciprocating the carriage, a reversing member controlling reversal of the carriage, a member oscillated by the carriage, dogs carried by the oscillated member to actuate the reversing member, means for temporarily placing the reversing member and one of the dogs out of reversing relation to amplify the stroke of the carriage, means actuated by the oscillated member for controlling the restoration of the reversing member and dog to reversing relation, and means for again placing the reversing member and one of the dogs out of reversing relation to effect a final amplified stroke of the carriage; substantially as described.

8. In a device of the character described, a frame, a carriage, means for reciprocating the carriage, a reversing member controlling reversal of the carriage, a member oscillated by the carriage, dogs carried by the oscillated member to actuate the reversing member, means for temporarily placing the reversing member and one of the dogs out of reversing relation to amplify the stroke of the carriage, and means actuated by the oscillated member for controlling a change in speed of the carriage when said reversing member and dog are out of reversing relation; substantially as described.

9. In a device of the character described, a frame, a carriage, means for reciprocating the carriage, a reversing member controlling reversal of the carriage, a member oscillated by the carriage, dogs carried by the oscillated member to actuate the reversing member, means for temporarily placing the reversing member and one of the dogs out of reversing relation to amplify the stroke of the carriage, means actuated by the oscillated member for controlling a slowing down of the carriage during the amplified stroke of the carriage, and means actuated by the oscillated member for controlling a speeding up of the carriage at the conclusion of said amplified stroke; substantially as described.

10. In a device of the character described, a frame, a carriage, means for reciprocating the carriage, a reversing member controlling reversal of the carriage, a member oscillated by the carriage, dogs carried by the oscillated member to actuate the reversing member, means for temporarily placing the reversing member and one of the dogs out of reversing relation to amplify the stroke of the carriage, means actuated by the oscillated member for controlling a slowing down of the carriage during the amplified stroke of the carriage, means actuated by the oscillated member for controlling a speeding up of the carriage at the conclusion of said amplified stroke, and means for again placing the reversing member and one of the dogs out of reversing relation to effect a final amplified stroke of the carriage; substantially as described.

11. In a device of the character described, a frame, a carriage, means for reciprocating the carriage, a reversing member controlling reversal of the carriage, a member oscillated by the carriage, dogs carried by the oscillated member to actuate the reversing member, means for temporarily placing the reversing member and one of the dogs out of reversing relation to amplify the stroke of the carriage, means actuated by the oscillated member for controlling a slowing down of the carriage during the amplified stroke of the carriage, means actuated by the oscillated member for controlling a speeding up of the carriage at the conclusion of said amplified stroke, means for again placing the reversing member and one of the dogs out of reversing relation to effect a final amplified stroke of the carriage, and means for further speeding up the carriage during said final stroke; substantially as described.

12. In a device of the character described, a frame, a carriage, means for reciprocating the carriage, a reversing lever rockably mounted on the frame for controlling reversal of the carriage, a trip member movably mounted on said lever, dogs actuated by the carriage to engage the trip member, and means extending through the axis of the reversing lever for moving the trip member out of the path of the dogs; substantially as described.

13. In a device of the character described, a frame, a carriage, means for reciprocating the carriage, a reversing lever rockably mounted on the frame for controlling reversal of the carriage, a trip member movably mounted on said lever, dogs actuated by the carriage to engage the trip member, a plunger extending through the axis of the reversing lever for moving the trip member out of the path of the dogs, and a wire for actuating the plunger; substantially as described.

14. In a device of the character described, a frame, a carriage, means for reciprocating the carriage, a reversing member controlling reversal of the carriage, dogs actuated by the carriage to engage the reversing member, and means comprising a flexible wire movable endwise through a casing for placing the reversing member and one of the dogs out of reversing relation to amplify the stroke of the carriage; substantially as described.

15. In a device of the character described, a frame, a carriage, means for reciprocating the carriage, a reversing member controlling reversal of the carriage, dogs actuated by the carriage to engage the reversing member, means comprising a flexible wire movable endwise through a casing for placing the reversing member and one of the dogs out of reversing relation, and a work gauging member controlling a movement of said wire; substantially as described.

16. In a device of the character described, a frame, a carriage, means for reciprocating the carriage, a reversing member controlling reversal of the carriage, dogs actuated by the carriage to engage the reversing member, means comprising a flexible wire movable endwise through a casing for placing the reversing member and one of the dogs out of reversing relation, and means controlled by the carriage for causing a return of the reversing member and dog to reversing relation; substantially as described.

17. In a device of the character described, a frame, a carriage, means for reciprocating the carriage, a reversing member controlling reversal of the carriage, dogs actuated by the carriage to engage the reversing member, means comprising a flexible wire movable endwise through a casing for placing the reversing member and one of the dogs out of reversing relation, a work gauging member controlling a movement of the wire in one direction, and means controlled by the carriage for causing a return of the reversing member and dog to reversing relation; substantially as described.

18. In a device of the character described, a frame, a carriage, means for reciprocating the carriage, a reversing member controlling reversal of the carriage, dogs actuated by the carriage to engage the reversing member, means comprising a flexible wire movable endwise through a casing for placing the reversing member and one of the dogs out of reversing relation, a member oscillated by the carriage, and means on the oscillated member for shifting a second wire through a casing to control return of the reversing member and dog to reversing relation; substantially as described.

19. In a device of the character described, a frame, a carriage, means for reciprocating the carriage, a reversing member controlling reversal of the carriage, dogs actuated by the carriage to engage the reversing member, a work gauging member controlling the placing of the reverse member and one of the dogs out of reversing relation, a flexible wire movable endwise through a casing, a member oscillated by the carriage, and means on the oscillated member for shifting the wire to control return of the reversing member and dog to reversing position; substantially as described.

20. In a device of the character described, a frame, a carriage, means for reciprocating the carriage, a reversing member controlling reversal of the carriage, dogs actuated by the carriage to engage the reversing member, means for temporarily placing the reversing member and one of the dogs out of reversing relation to amplify the stroke of the carriage, a work gauging member controlling said operation, a grinding wheel, a dressing tool, and a flexible wire movable endwise under control of the work gauging member for effective advance of the dressing tool; substantially as described.

21. In a device of the character described, a frame, a carriage, means for reciprocating the carriage, a reversing member controlling reversal of the carriage, dogs actuated by the carriage to engage the reversing member, means for placing the reversing member and one of the dogs out of reversing relation to prevent reversal of the carriage, a work gauging member controlling said operation, a grinding wheel, a work head, a feed pawl controlling approach of the grinding wheel and work, and a flexible wire movable endwise under control of the work gauging member for stopping the operation of the feed pawl; substantially as described.

CLARENCE C. STEVENS.